United States Patent [19]
Bridges

[11] Patent Number: 5,193,401
[45] Date of Patent: Mar. 16, 1993

[54] MANIPULATOR INTEGRAL FORCE SENSOR

[76] Inventor: Robert H. Bridges, 28586 LaCumbre, Laguna Niguel, Calif. 92673

[21] Appl. No.: 780,742

[22] Filed: Oct. 18, 1991

[51] Int. Cl.$^5$ .............................................. G01L 3/02
[52] U.S. Cl. .......................... 73/862.195; 73/862.321
[58] Field of Search ........... 73/862.32, 862.33, 862.34, 73/862.19; 901/34, 46; 403/79, 161; 464/89, 92

[56] References Cited

U.S. PATENT DOCUMENTS

| | | | |
|---|---|---|---|
| 3,724,239 | 4/1973 | Calistrat | 464/92 |
| 4,228,664 | 10/1980 | McCoy | 464/92 |
| 4,600,357 | 7/1982 | Coules | 414/730 |
| 4,666,361 | 5/1989 | Kitabatake | 414/680 |
| 4,723,450 | 2/1988 | Coulter | 73/862.19 |
| 4,727,996 | 3/1988 | Fenn et al. | 212/213 |
| 4,754,652 | 7/1988 | Coulter et al. | 73/862.19 |
| 5,031,455 | 7/1991 | Cline | 73/862.34 X |

OTHER PUBLICATIONS

Oomichi et al, Robotics Research 1988, "Mechanics & Mutiple Sensory Bilateral Control of a Fingered Manipulator", p. 149.

Palm, International Encyclopedia of Robots, 1988, "Hands", p. 627.

Salisbury et al, Experimental Robotics I, 1990, "Determination of Manipulator Contact Information from Joint Torque Measurements", p. 472.

Vischer et al, Experimental Robotics I, 1990, "Design & Development of Torque-Controlled Joints", pp. 281-283.

Primary Examiner—Herbert Goldstein
Assistant Examiner—Elizabeth L. Shopbell
Attorney, Agent, or Firm—Walter A. Hackler

[57] ABSTRACT

An apparatus for direct measurement of torque in an articulated joint includes a driver assembly, a driven assembly with said driver assembly and driven assembly mounted on a common axis, for enabling angular displacement of the driven assembly relative to said driver assembly about said common axis. An interlock is provided and is responsive to a remote actuator, for rotating said driven assembly relative to said driven assembly, and at least one force sensor is disposed in a position for transmitting rotational force from said interlock to said driven assembly, for measuring said rotational force in order to provide a torque measurement.

23 Claims, 5 Drawing Sheets

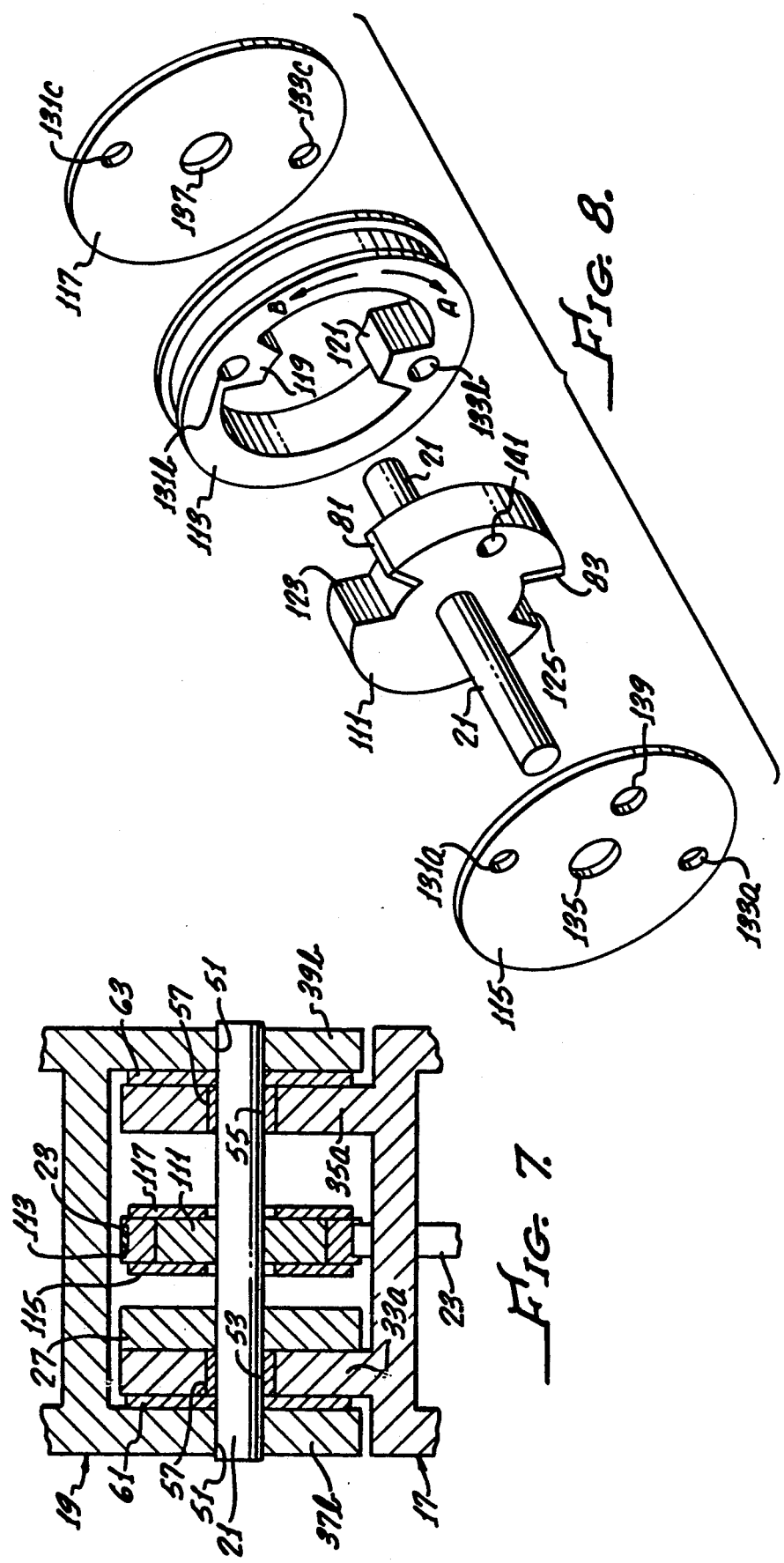

MANIPULATOR INTEGRAL FORCE SENSOR

TECHNICAL FIELD

The present invention is generally directed to apparatus for measuring torque directly at an active axis. More particularly, the apparatus of the present invention is directed towards manipulators where torque is to be measured directly at a joint.

BACKGROUND ART

Programmed robots, master-slave manipulators, telemanipulators, and material handling devices, in general, have a need to measure torque in articulated joints so that force and position control may be precisely exercised. For gripping devices, maximum gripping forces may be varied according to the nature of the object being grasped. In assembly operations involving a wise range of variables, adaptive control is dependent upon force and position feedback information. Where unplanned contact with an object is a risk, force feedback can be used to initiate corrective action and to prevent damage to the manipulator and/or to the object being grasped.

These manipulator devices also have size constraints as minimum weight and bulk become increasingly important in the area of the end effector. Where there are size constraints, various indirect means are now used to measure torque in a joint. These include: displacement measurement of a resilient element in the drive mechanism; measurement of actuator motor currents or other actuator parameters; force sensors in drive mechanisms; and strain gages in structural members.

One example of a resilient element in the drive mechanism is shown in U.S. Pat. No. 4,600,357 to Coules. This patent discloses a robot end effector with two opposing pivoted jaws. A helical gear assembly connects these jaws to a single rotary drive motor with a resilient element incorporated into the drive shaft. Rotary position sensors are incorporated into the drive shaft before and after the resilient element. The difference between the rotary position sensors provides an indication of the torque being transmitted.

U.S. Pat. No. 4,727,996 to Fenn et al. discloses a gripping mechanism where the actuator motor current is sensed as an indirect indication of the gripping forces. Only a dynamic reading is provided. As changing ambient conditions can effect the torque force, critical information is not available when the motor is inactive.

U.S. Pat. No. 4,666,361 to Kitabatake et al. discloses the use of force sensors to indirectly measure torque. A rotary motor is used to drive a worm wheel assembly which is connected to an arm joint by means of a drive belt. Force sensor assemblies are located at opposite ends of the worm gear. An indication of the torque at the arm joint is provided by measuring the axial force present in the worm gear. The direction of the torque in the arm pivot is indicated by which force sensor is active. The force sensors can continue to monitor the torque while the motor is inactive.

Strain gages for indirect torque measurement are used in advanced hand-like grasping devices with multiple and closely spaced joints. An example is the Stanford/JPL hand-like robot end effector. (International Encyclopedia of Robots. R. Dorf, Editor. 1988, page 627). Drive motor actuating forces are transmitted by cables in flexible conduits from the drive motors located beyond the end effector wrist. An indication of torque at each joint is provided by strain gages incorporated in the cable guiding structure.

In all these preceding examples of indirect measurement of torque, errors can be introduced by friction and tolerance variations in the mechanical linkage between the sensor and the joint. Also, the effects of gravity and inertia have to be recognized as the actual torque present may be but one component of the indirect sensor measurement.

As operating speeds increase, the adverse impact of inertia becomes of increasing importance in indirect measurement of torque. (J. K. Salisbury et al, "Determination of Manipulator Contact Information from Joint Torque Measurements", Experimental Robotics I, 1990).

To measure torque directly at the joint, Stanford University's Robotics Laboratory has placed strain gages on the spokes of a final drive wheel which is concentric with the joint axis. The Laboratory, as an alternative, also has placed a complex of four contact-free distance sensors to measure the beam deflection of the spokes of the final drive wheel. ("Design and Development of Torque-Controlled Joints", Experimental Robotics I, 1990, pages 281-283). The need to provided a drive wheel with spokes sufficient in length for the placement of strain gages or contact-free distance sensors limits the minimum overall size of the drive wheel. In the reference cited, the drive wheel was added externally to the joint and increased the overall size of the joint.

T. Oomichi et al ("Mechanics and Multiple Sensory Bilateral Control of a Fingered Manipulator", Robotics Research 1988, page 149) describes force sensors embedded between the finger joints. Forces at right angle to the center-line of the fingers can be measured in two directions and thus provide a reading of the torque present and its direction. The embedded sensor becomes in effect a structural member of the finger and reduces the space available for the routing of actuator mechanisms.

In my pending patent application "Manipulator Integral Force Sensor", Patent and Trademark Office Ser. No. 07/614,099, a displacement sensor and a resilient element are integral with the shaft of a joint for the direct measurement of torque.

The present invention provides a simple apparatus to measure torque directly at a joint and eliminate the errors introduced when indirect measurements are made of joint torque. The simplicity of the apparatus provides for a compact joint assembly essential for increasingly complex end effectors.

The present invention provides an alternative to that described in my pending patent application cited above.

SUMMARY OF THE INVENTION

The present invention provides a compact means to make direct torque measurements in articulated joints used in manipulators, robots and other devices.

The present invention is intended to function with any combination of actuator and power transmission means which may be used to cause angular displacement of an articulated joint.

This invention provides for an articulated joint with a driver assembly, a driver collar, and a driven assembly which are all positioned around a common shaft. An actuator means on the driver assembly is connected to the driver collar so that bidirectional rotary motion can be imparted to the driver collar. This rotary motion in turn is imparted to the driven assembly through an interlock means. One part of the interlock means is integral with the driver collar. The second part of the interlock means is integral with the driven assembly. The interlock means first and second parts make contact at only one point for each of the two directions of rotation. At each of these two contact points, the contacting surfaces, one for the interlock means first part and one for the interlock means second part, are in plains which substantially passes through the axis of the common shaft. At each of the two contact points, one of the two contacting surfaces is a force sensor. The sensor outputs are a measure of the torque present as any force present about the common shaft between the driver assembly and the driven assembly is passed through one of the two sensors.

Should an external force be applied to the driven assembly, any torque being transmitted to the driver assembly will be measured and passed through by the sensor configured to measure actuator developed torque in the opposite direction.

A rotary position sensor may be added concentric with the common shaft to measure the angular displacement of the driven assembly relative to the driver assembly.

BRIEF DESCRIPTION OF THE DRAWINGS

A better understanding of the present invention may be had with the consideration of the following detailed description, taken in conjunction with the accompanying drawings in which:

FIG. 7 is a cross-sectional overall view, similar to FIG. 2 and FIG. 5, showing the overall layout of a third embodiment of the present invention;

FIG. 8 is an exploded perspective view of the interlock means of the third embodiment of the present invention wherein the driven collar has a driver collar radially superimposed onto it and interlock means are provided so that the driver collar can pass torque to the driven collar. The interlock consists of fingers radially extending from one collar to recesses in the other collar.

DETAILED DESCRIPTION OF THE INVENTION

Figure 1:
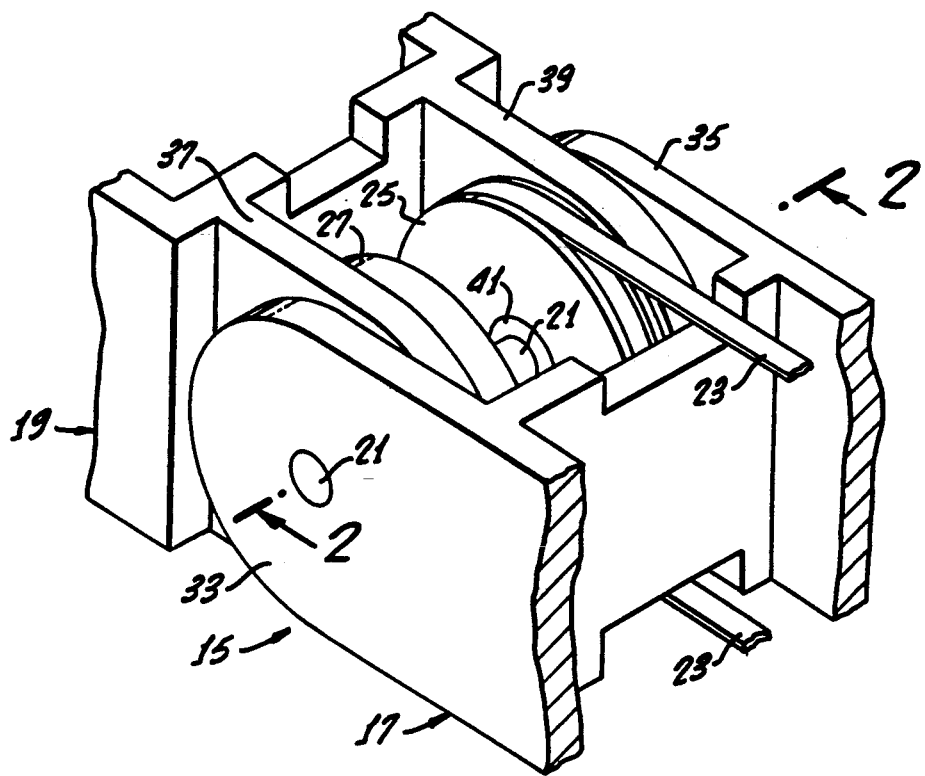
FIG. 1 is a perspective view of an articulated joint in accordance with the present invention.
Figure 2:
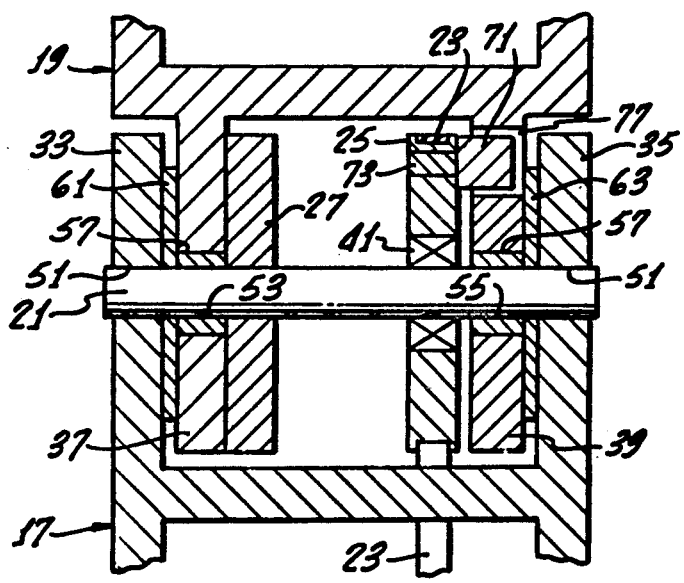
FIG. 2 is a cross-sectional view taken along lines 2—2 of FIG. 1 showing the overall layout of a first embodiment of the present invention.
Figure 3:
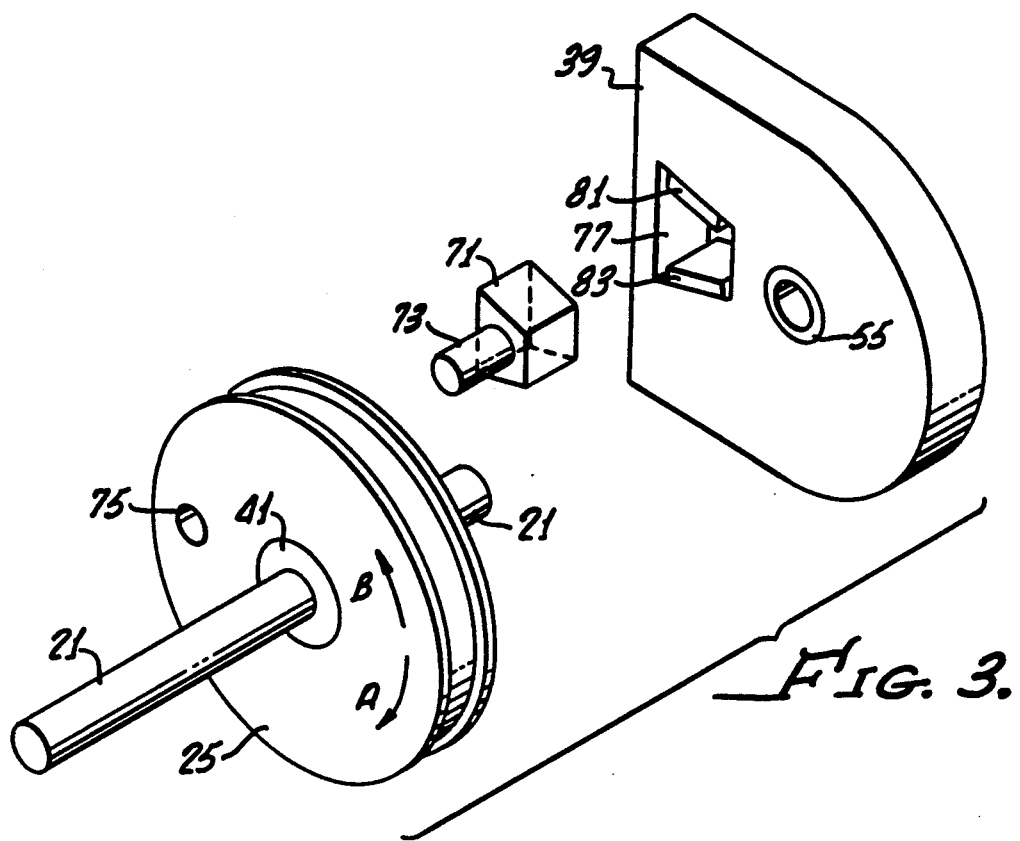
FIG. 3 is an exploded perspective view of the interlock means of the first embodiment of the present invention wherein the interlock means consists of a finger projecting from the driver collar and engaging surfaces incorporated directly in the driven assembly.

Turning now to FIG. 1, there is shown articulated joint 15, in accordance with the present invention, which has driver assembly 17 and driven assembly 19 disposed about common shaft 21. An actuator (not shown) is connected by belt 23 to driver collar 25. Hubs 33, 35 are part of the structure of driver assembly 17. Hubs 37, 39 are part of the structure of driven assembly 19. Bearing 41 rotationally secures driver collar 25 to common shaft 21. The interlock between driver collar 25 and hub 39 is not shown here but is shown in FIG. 2 and FIG. 3. Rotary position sensor 27 measures the angular displacement of driven assembly 19 relative to driver assembly 17. The sensor lead wires are not shown in order to show the mechanical details more clearly.

As shown in FIG. 2, hubs 33, 35 of driver assembly 17 are secured to common shaft 21 at inline bores 51, 51. Bearings 53, 55 in inline bores 57, 57 permit hubs 37, 39 of driven assembly 19 to rotate around common shaft 21. Thrust bearing 61 disposed between hubs 33, 37 and thrust bearing 63 disposed between hubs 35, 39 maintain a fixed longitudinal relationship around common shaft 21 of driver assembly 17 and drive assembly 19.

Rotary position sensor 27 has one of its active elements mounted on hub 37 of driven assembly 19 and the other on common shaft 21. As common shaft 21 is secured to driver assembly 17, a measurement is made of the angular displacement of driven assembly 19 relative to driver assembly 17. Driver collar 25 is rotationally secured to common shaft 21 by bearing 41 and is, with clearance, adjacent to hub 39. A finger 71, secured to driver collar 25 by extension 73 and inserted in recess 77 of hub 39, provides a means for interlocking driver collar 25 and hub 39.

This interlock between driver collar 25 and hub 39 of driven assembly 19 is shown more clearly in FIG. 3. Finger 71 is secured to driver collar 25 by extension 73 being inserted into bore 75. Hub 39 has recess 77 which has force sensors 81, 83 secured within. Recess 77 is of a size so that when, all components are assembled, finger 71 contacts only force sensor 81 when the rotation of driver collar 25 is in the direction of arrow A or contacts only force sensor 83 when driver collar 25 rotation is in the direction of arrow B. When force sensor 81 or force sensor 83 is engaged, the force present is measured as it is passed through to driven assembly 19.

In this and other embodiments of the present invention described here within, the contact between the interlock fingers and the active surface of force sensors 81, 83 is in a plane which substantially passes through the centerline of common shaft 21.

Force sensors 81, 83 may be of any suitable type, for example, Interlink Electronics, Inc., force sensing resistor assemblies or A. L. Design, Inc., force sensing strain gage assemblies. Selection will be effected by size, force, precision and other parameters of a given application. It should be appreciated that other basic types of force sensors currently being developed, i.e., fibre optics, may also be suitable for use in the present invention.

Optionally, a resilient pad may be substituted for either force sensor 81 or force sensor 83 if a torque measurement is required to be made in only one direction of rotation. Also, either force sensor 81 of force 83 may be relocated to the opposing surface.

Figure 4:
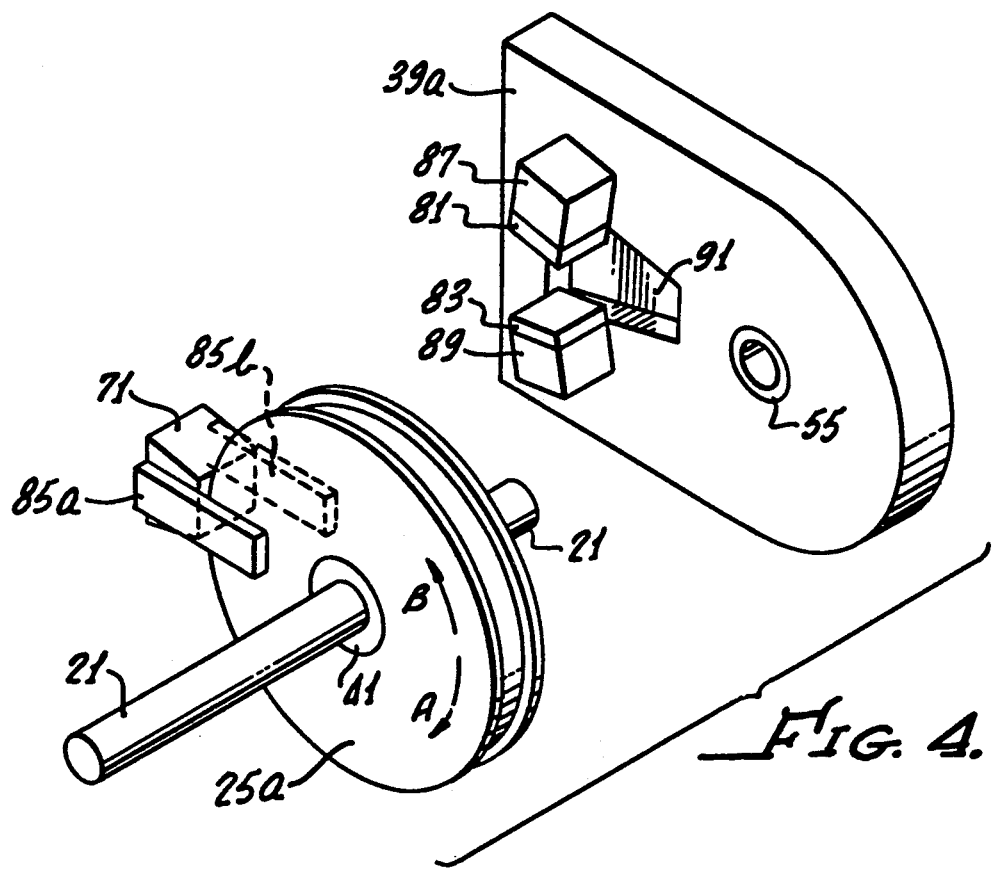
FIG. 4 is an exploded perspective view of an alternate placement of the interlock means shown in FIG. 3.

An alternate mounting for finger 71 is shown in FIG. 4. Extensions 85a, 85b are mounted on opposite sides of driver collar 25a and secure finger 71 to driver collar 25a. Hub 39a has replaced hub 39 in order to provide the greater length required with finger 71 extending away from common shaft 21. Hub 37a (not shown) has replaced hub 37 so as to also provide the same greater length. Sensor 81 is secured to hub 39a by mount 87. Sensor 83 is secured to hub 39a by mount 89.

Recess 91 in hub 39a provides clearance for extension 85b when all components are assembled. Rotation of driver collar 25 in the direction of arrow A results in finger 71 engaging force sensor 81 which measures the force present as it is passed through to driven assembly 19 through mount 87 and hub 39a. Rotation of driver collar 25a in the direction of arrow B results in finger 71 engaging force sensor 83 which measures the force present as it is passed through to driven assembly 19 through mount 89 and hub 39a.

A further alternate mounting of finger 71 would be to secure it to hub 39 and place sensors 81, 83 on surfaces incorporated into driver collar 25.

Figure 5:
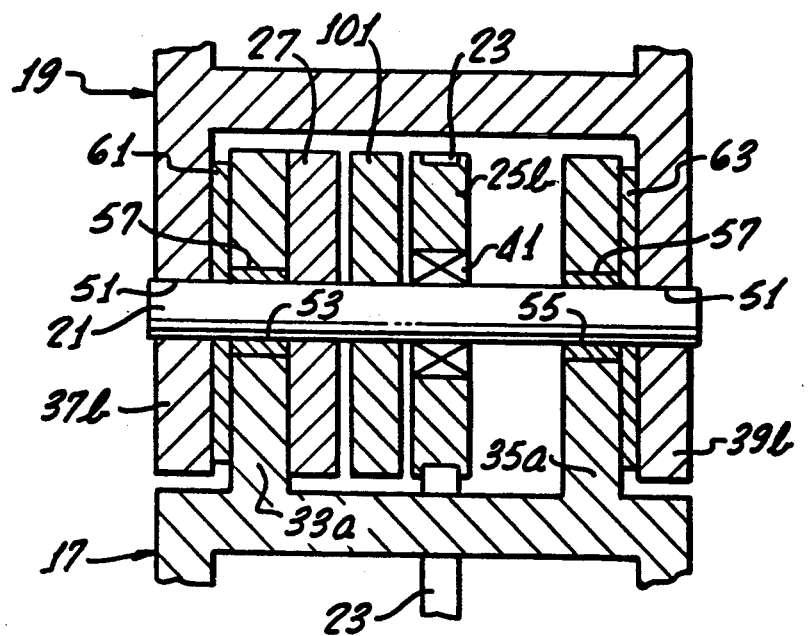
FIG. 5 is a cross-sectional view, similar to FIG. 2, showing the overall layout of a second embodiment of the present invention.

Turning now to FIG. 5, there is shown an alternate embodiment of the present invention. The hubs of the driver assembly 17 and driven assembly 19 have exchanged their relative position about common shaft 21. Hubs 37b, 39b of driven assembly 19 are at the opposite ends of common shaft 21 and are secured to common shaft 21 at inline bores 51, 51. Hubs 33a, 35a of driver assembly 17 are rotationally secured to common shaft 21 by bearings 53, 55 in inline bores 57, 57. Thrust bearings 61, 63 are disposed between the hubs to maintain a consistent longitudinal relationship between driver assembly 17 and driven assembly 19 about common shaft 21. The rotary position sensor 27 has one of its active elements secured to hub 33a of driver assembly 17. The other active element of rotary position sensor 27 is secured to common shaft 21. As common shaft 21 is secured to hubs 37b, 39b of driven assembly 19, rotary position sensor 27 measures the angular displacement driven assembly 19 relative to driver assembly 17. Driven collar 101 is secured to common shaft 21 and is placed with clearance adjacent to driver collar 25b which is rotational secured to common shaft 21 by bearing 41.

Figure 6:
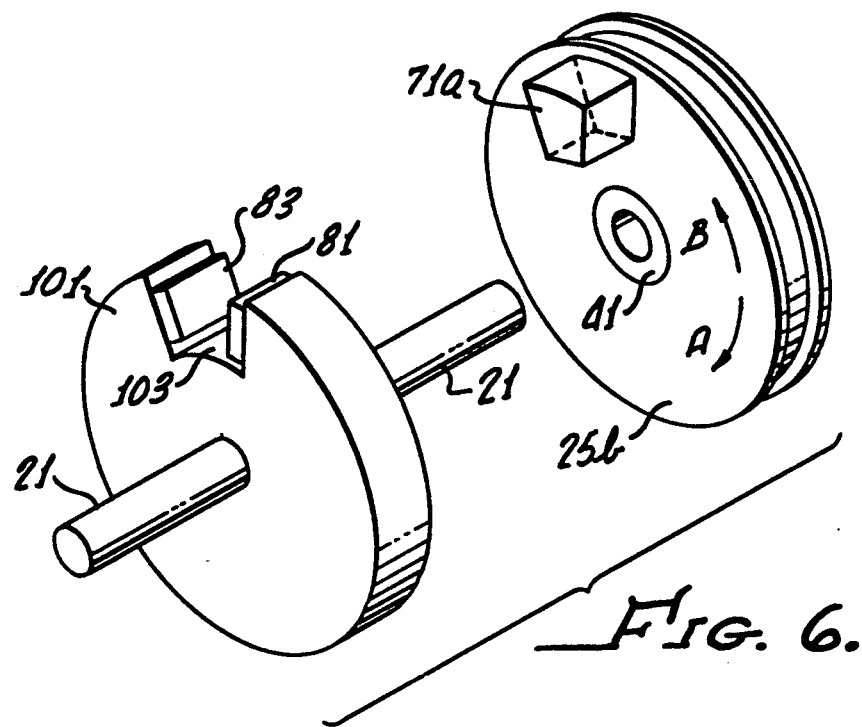
FIG. 6 is an exploded perspective view of the interlock means of the second embodiment of the present invention wherein a driven collar is secured to the common shaft and the common shaft is secured to the driven assembly so that the driven collar and common shaft are an integral part of the driven assembly, the interlock consisting of a finger projecting from the driver collar and engaging surfaces incorporated into the driven collar.

As shown in FIG. 6, finger 71a is secured to driver collar 25b by extension 73a (not shown) and, when all components are in place, it is positioned with clearance in recess 103 of driven collar 101. When there is rotation of driver collar 25b in the direction of arrow A, finger 71a engages force sensor 81 which is secured in recess 103. Force sensor 81 measures the force present as it is passed through to driven assembly 19 through driven collar 101, common shaft 21 and hubs 37b, 39b. When the rotation of driver collar 25b is in the direction of arrow B, finger 71a engages sensor 83 which is secured in recess 103. Sensor 83 measures the force present it is passed through to driven assembly 19 through driven collar 101, common shaft 21 and hubs 37b, 39b.

An alternate would be to secure finger 71a to driven collar 101 and relocate sensors 81, 83 to surfaces incorporated into driver collar 25b.

Turning now to FIG. 7, another embodiment of the present invention is shown. FIG. 7 is identical to FIG. 5 except that driven collar 101 has been replaced by driven collar 111 and driver collar 25 has been replace by driver collar 113. Driver collar 113 is radially superimposed onto driven collar 111 and their longitudinal relationship is maintained by side plates 115, 117.

As shown in FIG. 8, driver collar 113 has fingers 119, 121 which radially point inward. When the components are assembled, finger 119 fits with clearance into recess 123 of driven collar 111, and finger 121 fits with clearance into recess 125 of driven collar 111. Driver collar 113 has a sliding fit over driven collar 111 which is made of a material with a low coefficient of friction such as DuPont's Delrin. The components are held in place a fastener (not shown) which passes through bores 131a, 131b and 131c, and a fastener (not shown) which passes through bores 133a, 133b and 133c. Bores 135, 137 permit common shaft 21 to pass through side plates 115, 117 with clearance. Side plates 115, 117 have a sliding fit with driven collar 111. Bores 139 and 141 provide access for the sensor lead wires (not shown).

When driver collar 113 rotates in the direction of arrow A, finger 119 engages force sensor 81 which is secured in recess 123. Force sensor 81 measures the force present as it is passed through to driven assembly 19 through driven collar 111. Driven collar 111 is secured to common shaft 21 which is turn is secured to hubs 37a, 39b of driven assembly 19. Similarly, when driven collar rotates in the direction of arrow B, finger 121 engages force sensor 83 which is secured in recess 125. Force sensor 83 measures the force present as it is passed through to driven assembly 19.

Figure 9:
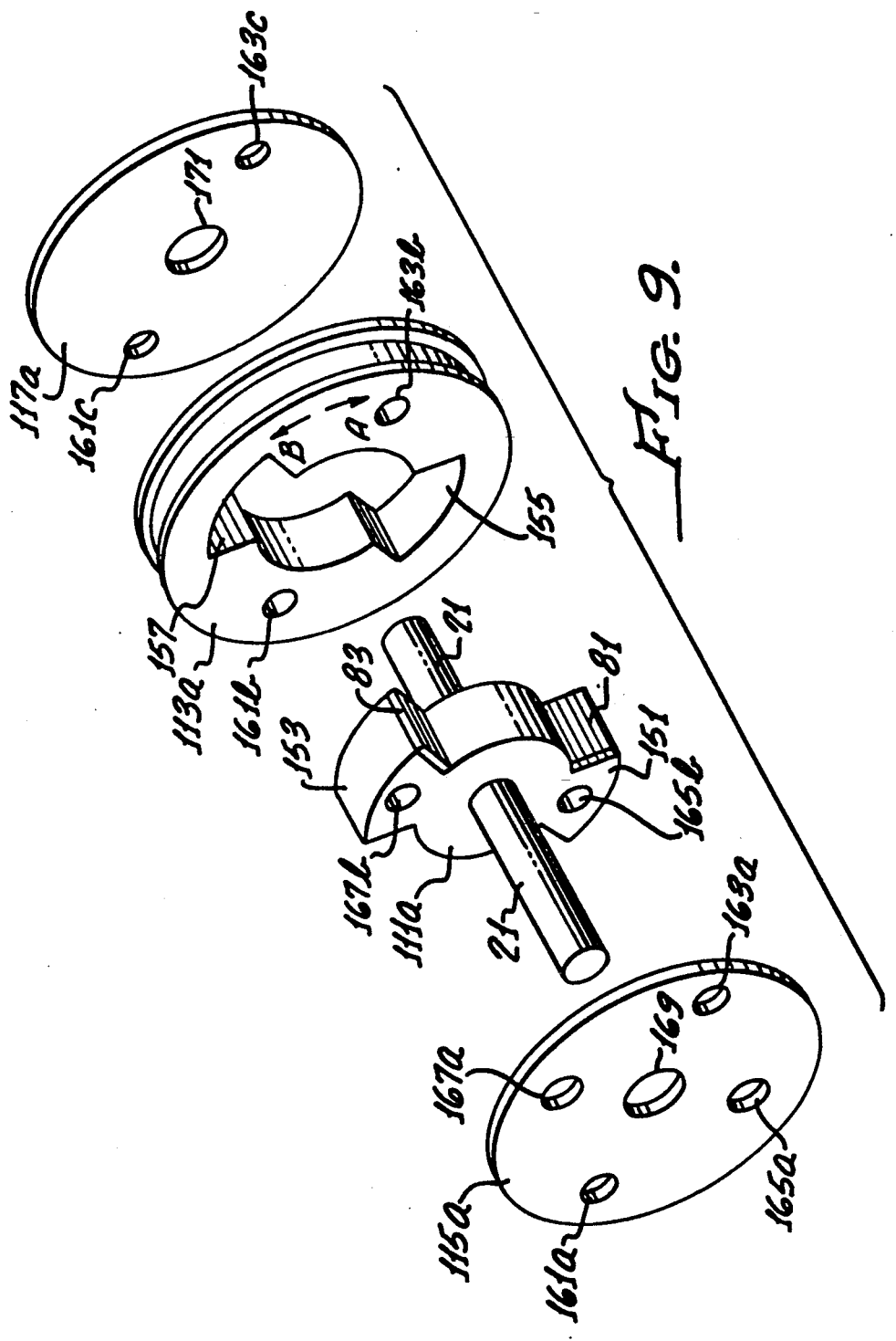
FIG. 9 is an exploded perspective view of an alternate placement of the interlock means of the third embodiment of the present invention.

An alternate configuration for the driver collar radially superimposed onto the driven collar is shown in FIG. 9. The interlock's fingers 151, 153 on driven collar 111a extend radially outward from common shaft 21. When the components are assembled, fingers 151, 153 fit with clearance into recesses 155, 157 of driver collar 113a. Driver collar 113a has a sliding fit over driven collar 111a which is made of a material with a low coefficient of friction such as DuPont's Delrin. A fastener (not shown) passes through bores 161a, 161b and 161c and a fastener (not shown) passes through bores 163a, 163b and 163c to retain the components in place. Bores 165a, 165b and bores 167a, 167b provide access for the sensor lead wires (not shown). Bores 169, 171 permit common shaft 21 to pass through end plates 115a, 117a with clearance. End plates 115a, 117a have a sliding fit with driven collar 111a.

When driver collar 113a rotates in the direction of arrow A, it engages force sensor 81 which is secured to finger 151 of driven collar 111a. Force sensor 81 measures the force present as it passes it to driven collar 111a which is secured to common shaft 21 which in turn is secured to hubs 37a, 39a of driven assembly 19. Similarly when driver collar 113a rotates in the direction of arrow B, it engages sensor 83 which is secured to finger 153. Force sensor 83 measures the force present as it is passed through to driven collar 111a which is an integral part of driven assembly 19.

Although there has been herein above described specific arrangements of torque measuring apparatus, in accordance with the invention, for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. An apparatus for direct measurement of torque in an articulated joint responsive to movement of a remote actuator, said apparatus comprising:
   a) a driver assembly;
   b) a driven assembly;
   c) means, mounting said driver assembly and driven assembly on a common shaft, for enabling angular displacement of the driven assembly relative to said driver assembly about said common shaft;
   d) a driver collar disposed in a concentric relationship with the common shaft and interconnected to the remote actuator;
   e) interlock means, responsive to the remote actuator, for rotating said driven assembly relative to said driver assembly;
   f) at least one force sensor means, disposed in said interlock means in a position for transmitting rotational force from said interlock means to said driven assembly, for measuring said rotational force in order to provide a direct measurement of torque measurement.

2. The apparatus of claim 1 further comprising a position sensor means for measuring the angular displacement of the driven assembly relative to the driver assembly in order to determine a relative position of the articulated joint.

3. The apparatus of claim 1 further comprising rotational position sensor means for measuring angular displacement of the driven assembly relative to the driver assembly for the monitoring of the relative position of the articulated joint.

4. The apparatus of claim 3 wherein the interlock means comprises finger means for interconnecting said driver collar means and the driven assembly.

5. The apparatus of claim 4 wherein said finger means comprises at least one finger projecting from said driver collar and said driven assembly comprises means defining surfaces for engaging said finger.

6. The apparatus of claim 4 wherein said finger means comprises at least one finger projecting from said driven assembly and said driver collar comprises means defining surfaces for engaging said finger.

7. The apparatus of claim 4 further comprising driven collar means for interconnecting said driver collar and the driven assembly, said driven collar means and driver hub being secured to the common shaft.

8. The apparatus of claim 7 wherein said finger means comprises at least one finger projecting from said driver collar means and said driven collar comprises defining surfaces for engaging said finger.

9. The apparatus of claim 7 wherein said finger means comprises at least one finger projecting from said driven collar means and said driver collar comprises defining surfaces for engaging said finger.

10. The apparatus of claim 7 wherein said driver collar and driven collar are coaxially dispersed in a plane perpendicular to the common axis.

11. The apparatus of claim 10 wherein said finger means comprises at least one finger projecting from said driver collar in a direction generally perpendicular to the said common axis and said driven collar comprises defining surfaces for engaging said finger.

12. The apparatus of claim 10 wherein said finger means comprises at least one finger projecting from said driven collar in a direction generally perpendicular to the said common axis and said driver collar comprises defining surfaces for engaging said finger.

13. The apparatus of claim 1 further comprising second force sensor means disposed in said interlock means in a position so that rotational forces in a second direction of rotation, opposite to said first direction of rotation, pass through said second force sensor means, for measuring the rotational force in order to provide a direct measurement of the torque present in the articulated joint in said second direction.

14. The apparatus of claim 13 further comprising rotational position sensor means for measuring angular displacement of the driven assembly relative to the driver assembly for the monitoring of the relative position of the articulated joint.

15. The apparatus of claim 1 wherein the interlock means comprises finger means for interconnecting said driver collar means and the driven assembly.

16. The apparatus of claim 15 wherein said finger means comprises at least one finger projecting from said driver collar and said driven assembly comprises means defining surfaces for engaging said finger.

17. The apparatus of claim 15 wherein said finger means comprises at least one finger projecting from said driven assembly and said driver collar comprises means defining surfaces for engaging said finger.

18. The apparatus of claim 15 further comprising driven collar means for interconnecting said driver collar and the driven assembly, said driven collar means and driven hub being secured to the common shaft.

19. The apparatus of claim 18 wherein said finger means comprises at least one finger projecting from said driver collar means and said driven collar comprises defining surfaces for engaging said finger.

20. The apparatus of claim 18 wherein said finger means comprises at least one finger projecting from said driven collar means and said driver collar comprises defining surfaces for engaging said finger.

21. The apparatus of claim 18 wherein said driver collar and driven collar are coaxially dispersed in a plane perpendicular to the common axis.

22. The apparatus of claim 21 wherein said finger means comprises at least one finger projecting from said driver collar in a direction generally perpendicular to the said common axis and said driven collar comprises defining surfaces for engaging said finger.

23. The apparatus of claim 21 wherein said finger means comprises at least one finger projecting from said driven collar in a direction generally perpendicular to the said common axis and said driver collar comprises defining surfaces for engaging said finger.

* * * * *